United States Patent [19]
Crayford

[11] Patent Number: 5,305,321
[45] Date of Patent: Apr. 19, 1994

[54] ETHERNET MEDIA ACCESS CONTROLLER WITH EXTERNAL ADDRESS DETECTION INTERFACE AND ASSOCIATED METHOD

[75] Inventor: Ian Crayford, San Jose, Calif.

[73] Assignee: Advanced Micro Devices, Sunnyvale, Calif.

[21] Appl. No.: 841,113

[22] Filed: Feb. 24, 1992

[51] Int. Cl.⁵ .............................................. H04J 3/00
[52] U.S. Cl. ..................................... 370/94.1; 370/99
[58] Field of Search ................. 370/58.1, 58.2, 58.3, 370/60, 60.1, 61, 82, 83, 85.1, 85.2, 85.3, 85.4, 85.5, 85.6, 85.13, 85.14, 94.1, 99; 340/825.5, 825.51, 825.52

[56] References Cited

U.S. PATENT DOCUMENTS

| | | | |
|---|---|---|---|
| 4,914,652 | 4/1990 | Nguyen | 370/85.5 |
| 4,951,280 | 8/1990 | McCool et al. | 370/85.14 |
| 5,031,174 | 7/1991 | Natsume | 370/85.5 |
| 5,043,981 | 8/1991 | Firoozmand et al. | 370/85.1 |
| 5,050,165 | 9/1991 | Yoshioka | 370/85.13 |
| 5,136,582 | 8/1992 | Firoozmand | 370/85.1 |

FOREIGN PATENT DOCUMENTS 0436194 7/1991 European Pat. Off. .
9108627 6/1991 PCT Int'l Appl. .

OTHER PUBLICATIONS

Electronic Design, vol. 38, No. 8, Apr. 26, 1990, "Speed LAN-Address Filtering with CAMs".

Primary Examiner—Douglas W. Olms
Assistant Examiner—Alpus H. Hsu
Attorney, Agent, or Firm—Steven F. Caserza

[57] ABSTRACT

A method is provided for use with an Ethernet Media Access Controller (MAC) and a look-up memory external to the MAC, the method determines whether to accept or to reject an Ethernet packet which is decoded by the MAC into a serial data (SRD) signal stream and a serial data clock (SRDCLK) signal, the method comprises the steps of: converting the SRD signal stream into byte frames and loading the frames into a receive FIFO of the MAC; while the receive FIFO is being loaded, producing by the MAC, a boundary delimiter (BD) signal stream which delimits the frame boundary of each byte frame; while the receive FIFO is being loaded, providing the SRD signal stream, the SRDCLK signal and the BD signal stream from the MAC to the look-up memory; while the receive FIFO is being loaded, determining whether a prescribed field in the packet matches information stored in the look-up memory; while the receive FIFO is being loaded, informing the MAC by the look-up memory whether a match has been detected.

19 Claims, 7 Drawing Sheets

ETHERNET MEDIA ACCESS CONTROLLER WITH EXTERNAL ADDRESS DETECTION INTERFACE AND ASSOCIATED METHOD

BACKGROUND OF THE INVENTION

1. Field of the Invention

The invention relates generally to the detection of address and protocol information in Ethernet packets, and more particularly, to detection by Ethernet Media Access Controllers (MAC).

2. Description of the Related Art

Ethernet is a commonly used local area network scheme in which multiple stations are connected to a single shared serial data path. Typically, only one station can transmit data onto the path at a time. A station connected to the path transmits data in the form of a packet that includes a destination address. The packet propagates throughout the network medium and is received by all other stations. The addressed station copies the entire packet as it goes by; the others reject the packet after determining that it is addressed to another station.

Figure 1:
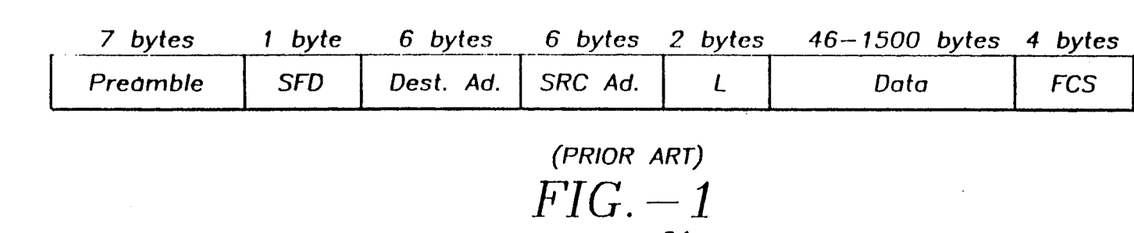
FIG. 1 is a representative Ethernet packet.

The drawing of FIG. 1 shows a representative Ethernet packet. Each packet comprises a series of 8-bit bytes of digital information. Each packet is preceded by a seven byte preamble composed of alternating 1s and ϕs. The preamble is followed by a one byte long start frame delimiter (SFD) which presents the following eight bit sequence: 10101011. After the SFD, follows a packet that can vary in length from 64 to 1518 bytes. In particular, six bytes (48 bits) of destination address immediately follow the preamble. The destination address designates the intended destination of the packet. After the destination address, follow six bytes of source address which designate the source of the packet. After that, there are two bytes that designate the packet length. Then follow between 46 and 1500 bytes of data. Finally, there are four bytes which constitute the frame checking sequence (FCS) for checking errors.

A Media Access Controller (MAC) serves as an interface between a shared data path and the stations connected to that path. Each node connected to the network includes a MAC which performs a number of functions involved in the transmission and reception of data packets. For example, during the transmission of data, the MAC assembles the data to be transmitted into a packet with address and error detection fields. Conversely, during the reception of a packet, the MAC disassembles the packet and performs address checking and error detection. In addition, the MAC typically performs encoding/decoding of digital signals transmitted over the shared path and performs preamble generation/removal as well as bit transmission/reception.

Since packet traffic on the shared serial data path can be heavy, with little time between packets, each MAC must be able to quickly assess whether a received packet is addressed to its station and should be copied or is addressed to another station and should be ignored. Each MAC has at least one physical address assigned to it.

Typically, a MAC includes a receive FIFO (first-in-first-out) memory which is used to temporarily store data captured from the shared path. In an earlier MAC, as the packet passes by on the shared path, the MAC takes the serial information and assembles it into eight bit frames which are loaded frame-by-frame into a receive FIFO. As the frames are loaded and the packet continues to pass by on the shared path, the MAC determines whether the destination address in the packet corresponds to the physical address of the MAC. If there is a match, then the MAC captures the entire packet. If there is no match, then the packet is rejected and the segment stored in the FIFO is flushed.

In some instances, however, a MAC will be required to receive packets on behalf of more than one station. For example, referring to the illustrative drawing of FIG. 2, there is shown a network which comprises three separate local area networks. First and second local area networks 20 and 22 are Ethernet networks. A third local area network 24 is an FDDI (Fiber Distributed Data Interface) Loop. The two Ethernet networks 20, 22, of course, utilize the Ethernet protocol on Ethernet data paths 26 and 28, respectively. The FDDI Loop, uses an FDDI protocol on data path 30. The first Ethernet network includes a plurality of workstations 20-1, 20-2 through 20-N. Similarly, the second Ethernet network also includes a plurality of workstation nodes 22-1, 22-2 through 22-M. Similarly, the FDDI Loop 24 includes a plurality of stations including the station labeled Bridge A and the station labeled Bridge B.

Figure 2:
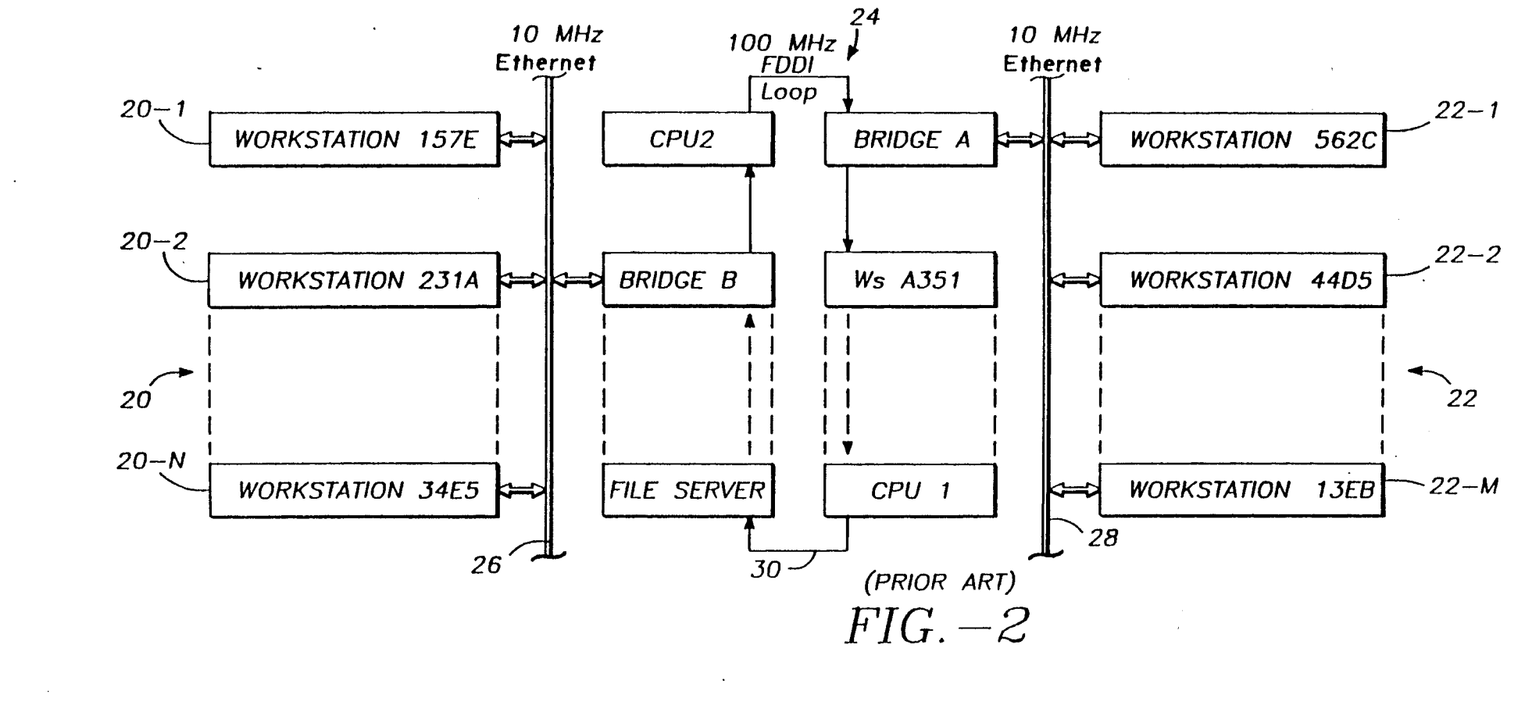
FIG. 2 is an illustrative drawing of a representative local area network that includes bridge circuits.

Each workstation node on the first and second Ethernet networks 20, 22 includes a MAC which serves as an interface between the respective shared data paths 26, 28 and the individual nodes. Bridge A and Bridge B serve to transfer information between respective workstations on the first Ethernet network 20 and workstations on the second Ethernet network 22. It is possible, for example, that the respective first and second Ethernet networks each have a large number, perhaps thousands, of workstations connected to them.

The MACs at Bridge A and at Bridge B must be able to compare the destination address in each received packet with a very large number of station addresses to determine whether or not the packet should be received. For example, the MAC at Bridge A, which is part of the second Ethernet network 22, must be able to determine whether or not a packet provided on data path 28 is destined for a workstation on the first Ethernet network 20. It must capture packets addressed to destination address 157E, 231A and 34E5, the physical addresses of workstations 20-1, 20-2 and 20-N. Conversely, the MAC at Bridge B, which is part of the first Ethernet network, must capture packets on data path 26 addressed to 562C, 4D5 and 13EB, the physical addresses of workstations 2-1, 22-2 and 22-M on the second Ethernet network 22.

Each MAC has a limited number of physical addresses that it can recognize. As a consequence, software hash techniques often are used to determine whether or not a particular Ethernet packet should be accepted or rejected. Unfortunately, such hash techniques can be imprecise and can lead to the acceptance of packets that should have been rejected. Moreover, such hash techniques can be relatively time consuming and can burden system resources. Since, for example, the data rate in the FDDI Loop is on order of ten times that of the Ethernet networks, speed in packet accept/reject can be imperative. Unfortunately, software hash techniques tend to slow down the packet processing.

Thus, there has been a need for an improved mechanism for determining whether or not to accept or reject an Ethernet packet received by a MAC. The present invention meets this need.

SUMMARY OF THE INVENTION

The present invention provides an Ethernet Media Access Controller (MAC) that has an extended address detection interface that can be used to more accurately and quickly resolve the destination address in a received packet. Decoded serial data and a decoded serial data clock produced from a received Ethernet packet by a Manchester encoder/decoder are provided externally together with a signal stream that delimits the start of the packet and that delimits packet byte boundaries within the serial data stream. This information can be used by an external look-up memory to determine whether or not the serial data from the packet matches data stored in the external look-up memory. That determination can be used to decide whether to accept or reject the packet.

Thus, the decoded and serialized packet data is provided external to the MAC together with byte boundary information that can be used to frame prescribed fields of the packet for comparison with externally stored digital information. This information can be used to detect address matches and can form the basis for a packet accept/reject decision. Hence, in essence, the physical address range of the MAC can be expanded externally.

In accordance with the teachings of this invention, a novel circuit is taught which can serve as a normal Media Access Controller (MAC) and which includes a minimum number of lines for connection, if desired, to external circuitry to provide an enhanced addressed loop-up function, with only a small impact on die size and pin count of the device. In one embodiment, a bit is set in the device for defining whether a packet is to be accepted or rejected based upon an address match detection.

These and other features and advantages of the present invention will become more apparent from the following description of exemplary embodiments thereof, as illustrated in the accompanying drawings.

The purpose and advantages of the present invention will be apparent to those skilled in the art from the following detailed description in conjunction with the appended drawings.

DETAILED DESCRIPTION OF THE PREFERRED EMBODIMENT

The present invention provides an Ethernet Media Access Controller (MAC) with an extended address detection interface unit and an associated method. The following description is presented to enable any person skilled in the art to make and use the invention, and is provided in the context of a particular application and its requirements. Various modifications to the preferred embodiment will be readily apparent to those skilled in the art, and the generic principles defined herein may be applied to other embodiments and applications without departing from the spirit and scope of the invention. Thus, the present invention is not intended to be limited to the embodiment shown, but is to be accorded with the widest scope consistent with the principles and features disclosed herein.

Figure 3:
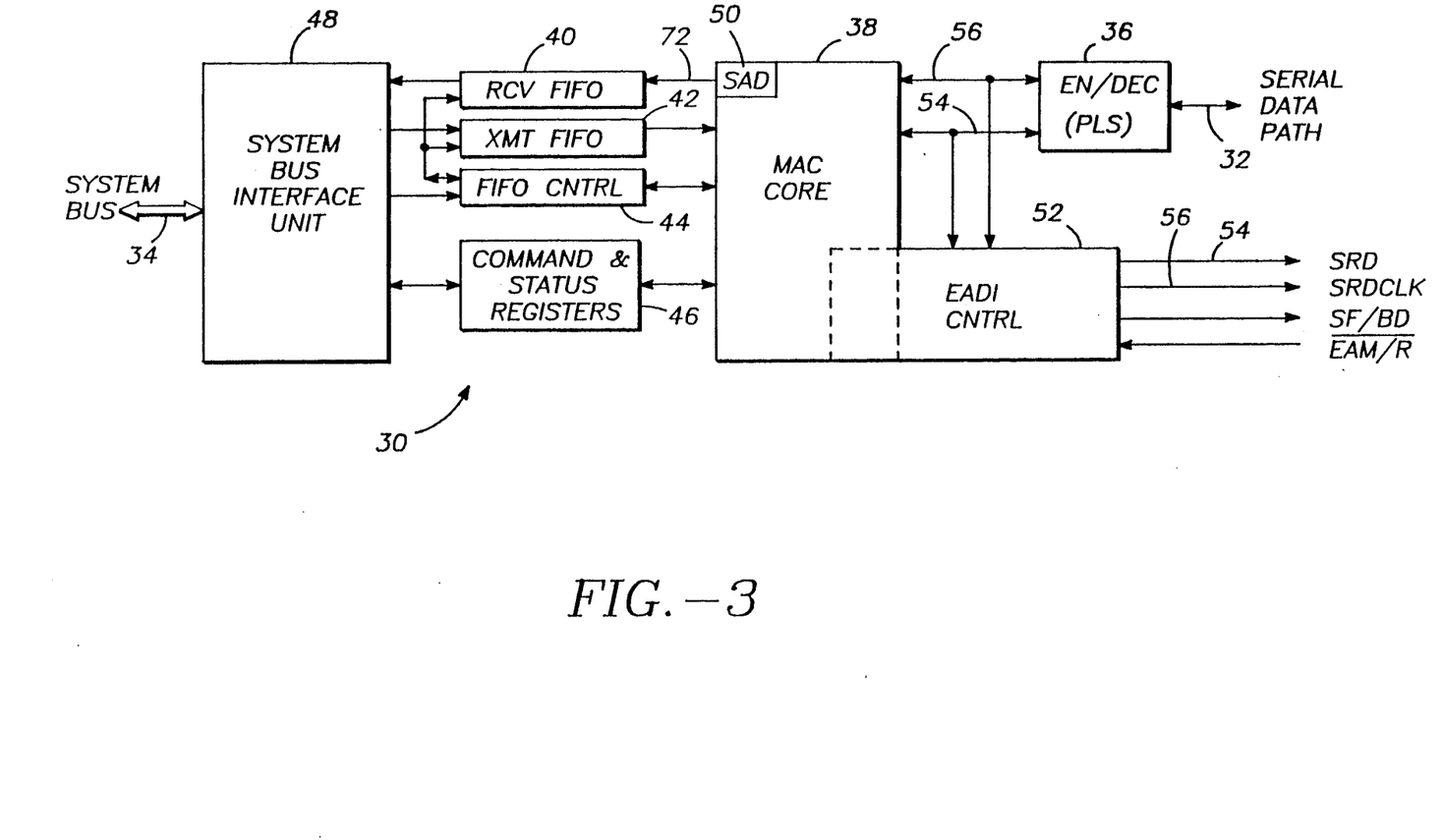
FIG. 3 is a block diagram of a media access controller in accordance with the present invention.

Referring the illustrative drawing of FIG. 3, there is shown a block diagram of a MAC 30 in accordance with the present invention. The MAC controls the passage of information between a shared Ethernet serial data path 32 and a system bus 34. The MAC 30 includes a Manchester encoder/decoder 36 and a MAC core 38, which in the preferred embodiment, is implemented in accordance with the IEEE 802.3 standard. The MAC 30 also includes a receive FIFO 40, a transmit FIFO 42 and FIFO control logic 44 as well as command and control registers 46. A system bus interface unit 48 is logically disposed between the receive and transmit FIFOs 40 and 42 and the system bus 34. The MAC core 38 includes a station address detect (SAD) unit 50 which determines whether packets received by the MAC 30 in fact are addressed to it and should be captured in their entirety, or are addressed to a different MAC station (not shown) and should be rejected.

The MAC 30 also includes an extended address detection interface (EADI) control unit 52. The EADI 52 advantageously provides an externally accessible interface which permits external circuitry, such as that discussed below, to assist the MAC 30 in determining whether or not it should capture the entirety of a packet received by it. The EADI 52 can be used to expand the number of physical addresses that can be assigned to the MAC 30, and which can be matched to a destination address in a packet without resort to software hashing techniques. The EADI also can provide a basis for rejecting packets that otherwise would have been accepted unnecessarily.

The Manchester encoder/decoder 36 is a well known device which need not be described in detail. It converts Manchester (or differential Manchester) coded serial data on the data path 32 into Nonreturn-to-Zero-Level (NRZ-L) or (Nonreturn-to-Zero-Invert on ones) coded serial data (SRD) on line 54 plus a serial data clock (SRDCLK) on line 56.

Figure 4:
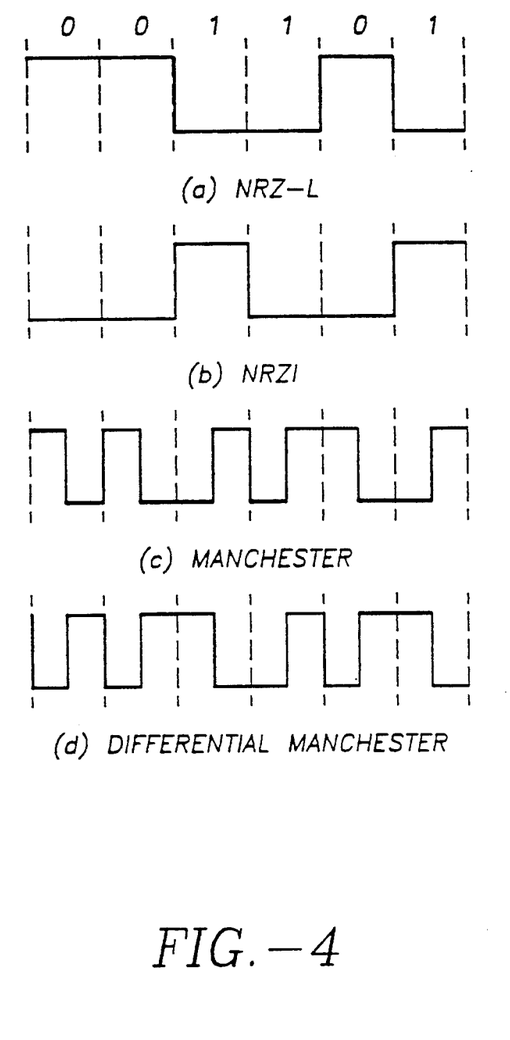
FIGS. 4a-4d are illustrative timing diagrams used to explain the operation of the Manchester encoder/decoder of the controller of FIG. 3.

Referring to the illustrative drawings of FIGS. 4a and 4c, there are shown examples of NRZ-L and Manchester encoding. In NRZ-L coding, a negative voltage is used to represent one binary value, and a positive voltage is used to represent the other. A variation is NRZI, which is shown in FIG. 4b. NRZI maintains a constant voltage pulse for the duration of a bit time. The data itself is encoded as the presence or absence of a signal transition at the beginning of the bit time. A transition (low-to-high or high-to-low) at the beginning of a bit time denotes a binary 1 for the bit time; no transition indicates a binary 0. NRZI is an example of differential encoding. In differential encoding, the signal is decoded by comparing the plurality of adjacent signal elements rather than the absolute value of a signal element. Manchester and differential Manchester encoding are examples of biphase encoding which is a form of encoding used on Ethernet data paths. Biphase schemes typically require at least one transition per bit time. In a Manchester code, there is a transition at the middle of each bit period. The mid-bit transition serves as a clock and also as data: a high-to-low transition represents a 0, and a low-to-high transition represents a 1. In differential Manchester, shown in FIG. 4d, the mid-bit transition is used only to provide clocking. The encoding of a 0 (1) is represented by the presence (absence) of a transition at the beginning of the bit period. Differential Manchester exhibits the further advantage of differential encoding in addition to those listed above.

As a Manchester encoded bit stream arrives at the input of the encoder/decoder 36, it is converted into a serial data (SRD) signal stream on line 54 and a serial data clock (SRDCLK) on line 56. The serial signals on lines 54 and 56 are simultaneously provided to the MAC core 38 and to the EADI unit 52.

The MAC core 38 assembles the SRD signal stream into eight bit frames which are loaded into the receive FIFO 40. As the SRD signal stream is being received, framed, and loaded, the station address detection (SAD) unit 50 of the MAC core 38 evaluates whether or not the received packet is addressed to this MAC 30. This is done by comparing the destination address in the packet to the physical address stored in a station address register (not shown). Additionally, the SAD unit 50 may perform a hash function to determine whether or not the packet should be accepted based upon a logical address match with the packet destination address.

At the same time, the EADI unit 52 provides the SRD stream and the SRDCLK signal externally so that further evaluation of the packet can be performed by external circuits. As explained more fully below, the EADI unit 52 provides a start frame/boundary delimiter (SF/BD) to such external circuits so that they can locate the destination address field or other information field in the serialized packet. The EADI unit 52 also includes an input terminal for receiving an extended address match/reject ($\overline{EAM/R}$) signal from an external circuit which indicates the result of the evaluation of the packet by the circuit.

If a determination is made that the entire packet is to be captured, then the receive FIFO 40 provides the packet to the system bus interface 48. The system bus interface 48 provides timing and control for communication with the system bus 34. If, on the other hand, a determination is made that the packet is not addressed to the MAC 30, or should otherwise be rejected, then the receive FIFO is flushed and the encoder/decoder 36 stops capturing the packet data.

In the present embodiment, the receive FIFO can hold at least sixty-four bytes of data. Moreover, bytes are provided on the Ethernet data path at a rate of approximately 800 ns per byte. Since the destination address is in the first six bytes following the SFD, the receive FIFO 40 provides ample time for a determination of whether or not to capture an entire packet, which can be up to 1,518 bytes long.

Conversely, during the transfer of information from the system bus 34 to the shared serial data path 32, the bus interface unit 48 provides timing and control for the receipt of information from the system bus 34 and for the provision of such information to the transmit FIFO 42. Information to be transmitted to the data path 32 is provided in multiples of 8-bit byte frames by the transmit FIFO 42 to the MAC core 38. The MAC core 38 assembles the information into a packet, with address and error detection fields, for example. The encoder/decoder 36 converts the SRD signal stream and the SRDCLK into a Manchester encoded signal and provides it on the Ethernet bus.

The FIFO control 52 controls the FIFOs 40 and 42 so that they are properly interfaced between the bus interface unit 48 and the MAC core 38. The command and status registers 54 are used to configure the MAC core and to report the status of packet transmission/reception.

The operation of the EADI unit 52 now will be explained in detail with reference to the block diagram of FIG. 5. It will be appreciated that portions of the EADI 52 are contained within the MAC core 38. The EADI unit 52 provides a series of signals to external terminals of the MAC 30 which can be used to determine whether or not a particular packet should be accepted or rejected. In particular, the SRD signal stream, the SRDCLK, and a signal stream designated as the SF/BD signal stream are provided externally. Moreover, the EADI unit 52 can receive from an external circuit a signal designated as the $\overline{EAM/R}$ which indicates whether or not there has been a match between a prescribed field of the packet and information stored in an external look-up memory.

Figure 5:
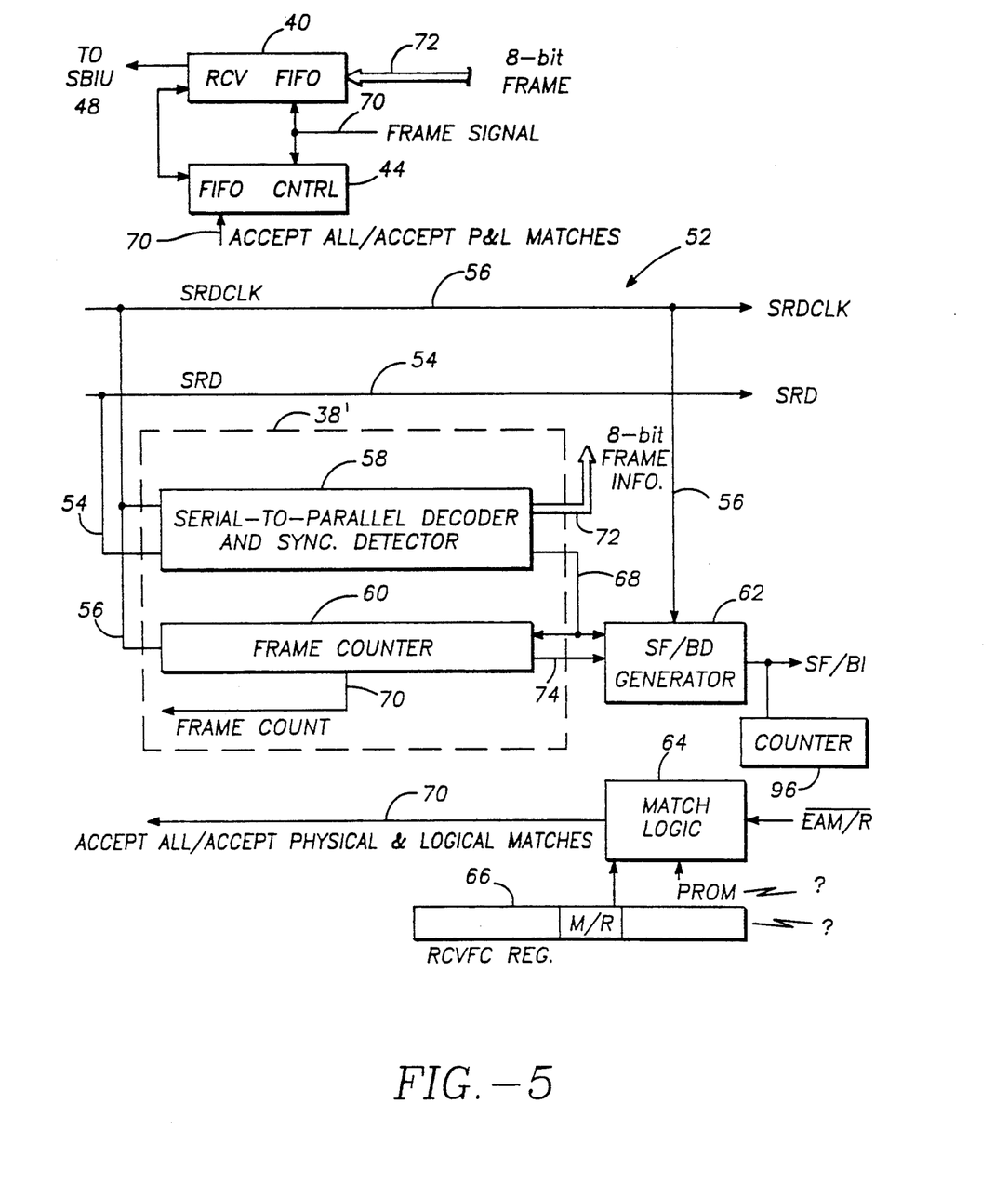
FIG. 5 is a block diagram showing details of the MAC core and the EADI unit of the controller of FIG. 3.

More specifically, the components indicated in FIG. 5 within dashed lines labeled 38' are disposed within the MAC core 38. These components are shared by the MAC core and the EADI unit. The EADI unit includes a serial-to-parallel decoder and sync detector 58, a frame counter 60, an SF/BD generator 62, match logic 64, and a receive frame control register (RCVFC) 66.

In operation, the SRD signal stream and the SRDCLK are produced by the encoder/decoder 36 in response to the receipt of an Ethernet packet and are provided via lines 54 and 56 to the serial-to-parallel decoder and sync detector 58. The sync detector comprises a comparison circuit which compares a received bit stream to the SFD pattern. The sync detector 58 detects the passage of an SFD which precedes an Ethernet packet and provides to the frame counter 60 and to the SF/BD generator 62 via line 68, a signal which indicates the start of the destination address field of an Ethernet packet. The frame counter 60, in response, counts SRDCLK signals provided via line 56, and after each eighth clock count, the frame counter 60 provides on line 70 a frame signal. The frame signal is provided to the receive FIFO 40, and to the FIFO control 44 which loads an 8-bit byte of packet data in response thereto. Each eight bits loaded by the receive FIFO 40 is framed by the serial-to-parallel decoder 58 which receives the SRD signal stream on line 54 and the SRDCLK signal on line 56. The framed bytes are provided by decoder 58 to the receive FIFO 40 via 8-bit line 72.

While the receive FIFO 44 is being loaded, eight parallel bits at a time, the SF/BD generator 62 produces the SF/BD signal stream. In particular, in response to the start frame signal provided on lines 68 by the sync detector 58, the SF/BD generator 62 produces a start frame (SF) signal. After that, the SF/BD generator produces a boundary delimiter (BD) signal stream that delimits the boundaries between bytes in the received serial packet. More specifically, the BD signal rises at the beginning of each 8-bit byte and falls between bits 3 and 4 of each 8-bit byte.

It will be appreciated that the SF/BD generator 62 essentially provides the same BD information externally that is provided internally on line 70 by the frame counter 60. That is, the SF/BD generator delimits packet bytes, which as explained below, serves as an index to the SRD stream that permits external circuitry to locate prescribed fields within the received serialized packet.

The BD signal stream is produced in response to the frame counter 60 which, after each 4 clock ticks (after the receipt of the SFD delimiter), produces a half-byte or "nibble" indication signal on line 68. Thus, the frame counter 60 provides two count signals per byte. These two count signals are used by the SF/BD generator to produce the SF/BD stream which comprises a series of pulses which have rising edges at the beginnings of the packet bytes and which have falling edges before the ends of the bytes, namely between bits 3 and 4. In the preferred embodiment, the beginning of a packet byte always is delimited by a rising edge of the SF/BD signal.

Figure 6A:
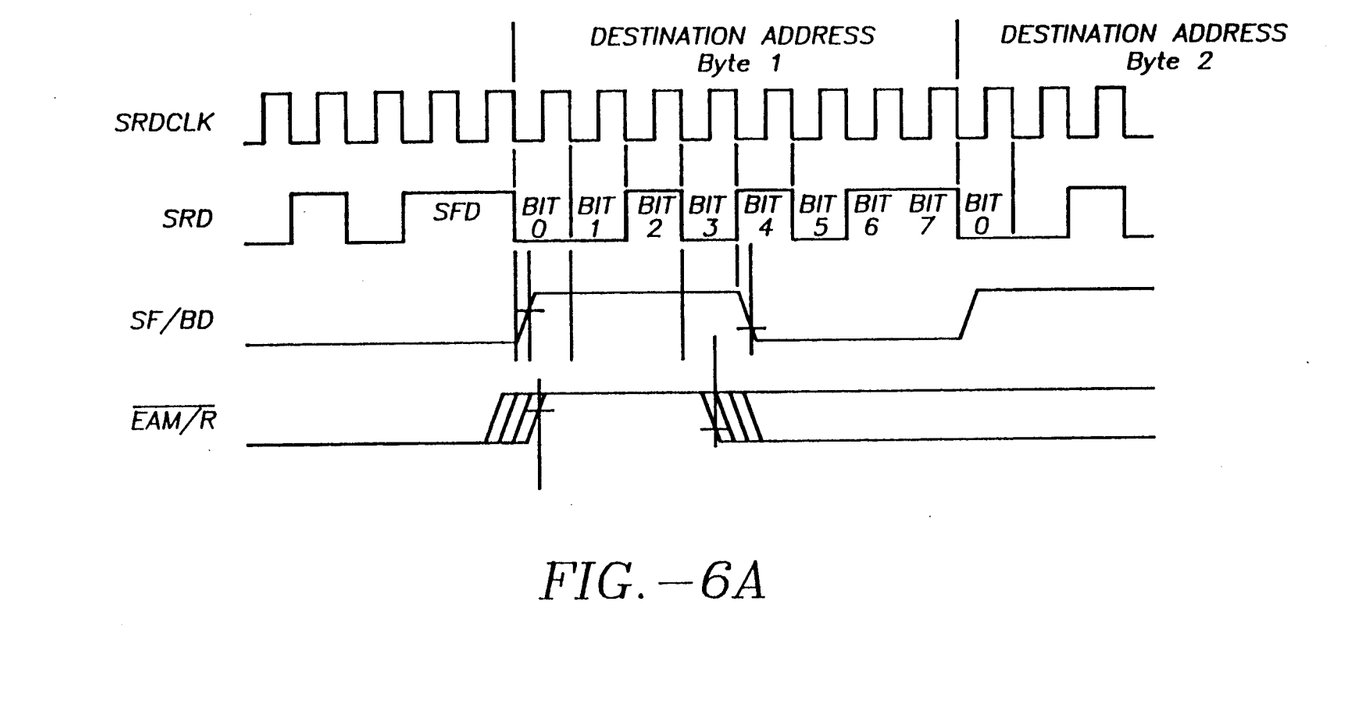
FIGS. 6a-6b are timing diagrams that illustrate signals provided in the EADI unit of the controller of FIG. 3.
Figure 6B:
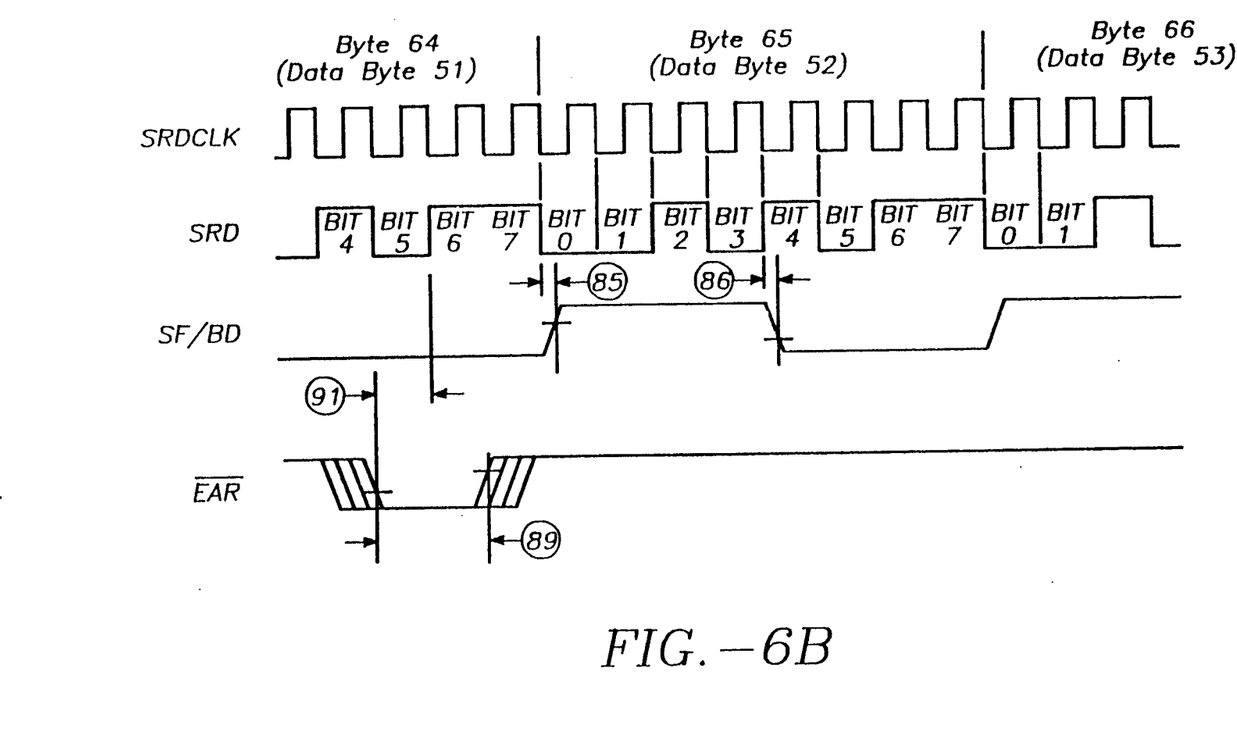

Referring to the illustrative drawing of FIGS. 6a and 6b, there are shown timing diagrams which illustrate representative signals that can be communicated through the EADI unit 52. The unit simply passes the SRD signal stream and the SRDCLK signal produced by the encoder/decoder 36 to external terminals accessible by an external circuit. In FIGS. 6a and 6b, the SRDCLK signal is represented by a clock pulse stream, and the SRD signal stream is represented by a series of binary signals that represent the binary values of the bits of the received packet. The SF/BD signal is represented by a series of pulses that repeat periodically during the provision of the SRD signal.

In particular, the SF/BD signal comprises two parts. The first part is the start frame (SF) signal which delimits the start of an SRD signal stream representing an Ethernet packet. The SF signal is the first pulse of the SF/BD signal stream. As shown in FIG. 6a, the SF signal rises at the beginning of the first destination address byte, and falls between bits 3 and 4 of the first destination address byte. The destination address is in the first field of an Ethernet packet. Thereafter, the BD signal rises during the first bit of each subsequent byte and falls between bits 3 and 4 of each subsequent byte. The EAM/R signal is provided to the EADI unit 52 as explained below.

Figure 7:
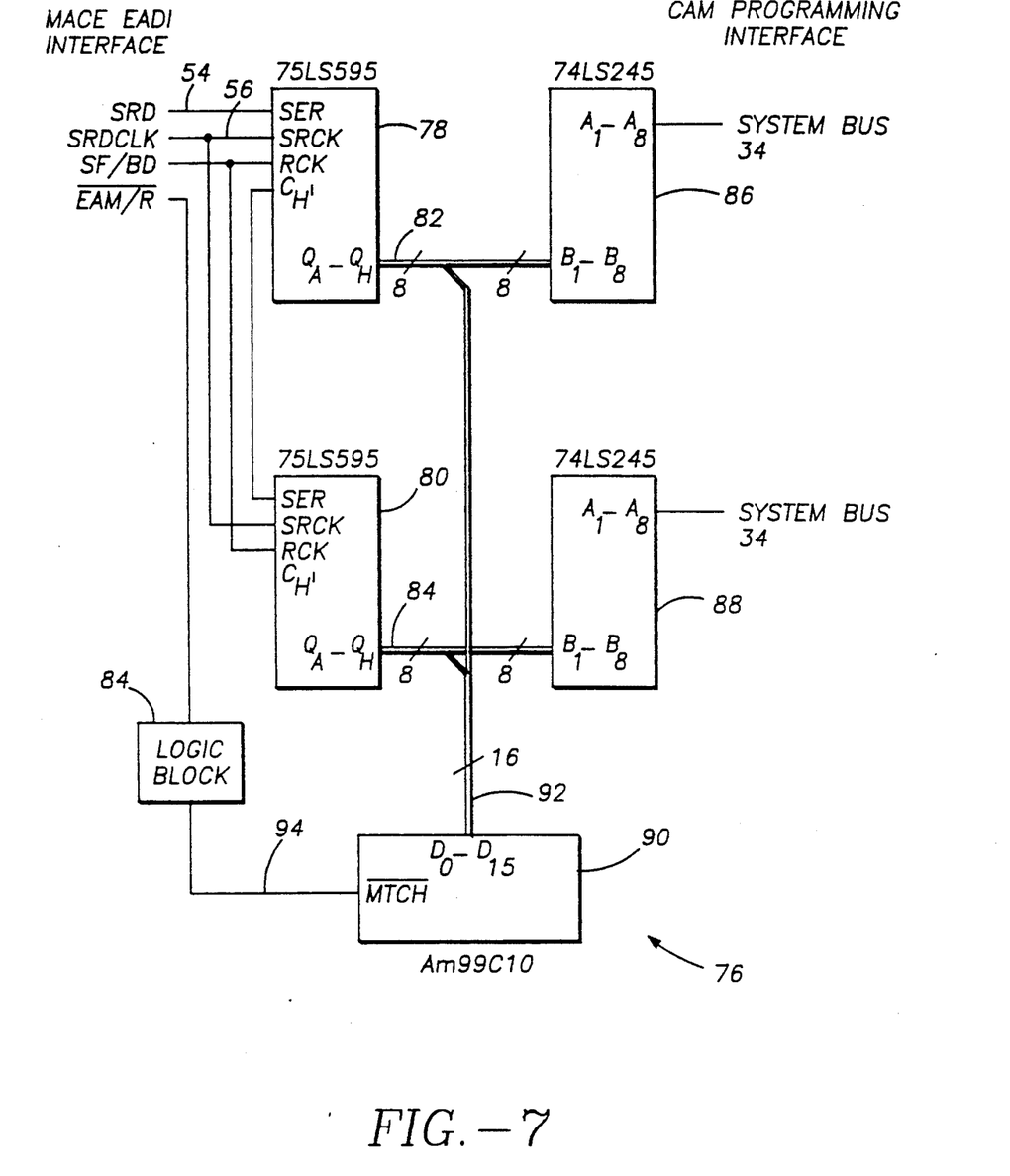
FIG. 7 is an illustrative drawing of an external look-up memory that can be used with the EADI unit of FIG. 5.

Referring now to the illustrative drawing of FIG. 7, there is shown a representative external look-up circuit 76 that can be used in conjunction with the MAC 30 of the present invention. It will be appreciated that, the external look-up circuit of FIG. 7 is merely representative of many different possible circuits that could be used. The circuit 76 includes first and second serial-to-parallel converters 78 and 80. These serial-to-parallel converters 78, 80 receive serial bits and convert them into 8-bit parallel signals on respective 8-bit lines 82 and 84. The circuit 76 also includes first and second input buffers 86 and 88. Finally, the circuit 76 includes a look-up memory 90.

In a present embodiment, for example, the look-up memory is a content addressable memory (CAM). A representative content addressable memory suitable for use in an external circuit 70 is the Am99C10A256×48 content addressable memory produced by Advanced Micro Devices, Inc. of Sunnyvale, Calif. The first converter 78 receives the SRD signal stream as well as the SRDCLK and the SF/BD signal. The second converter 80 receives the SRDCLK signal and the SF/BD signal. The overflow $C_H$ of the first converter 78 is connected to the serial data input of the second converter 80. The two converters together convert SRD bits into 16-bit parallel words which are provided to the memory 90 via 16-bit line 92. The look-up memory 90 accumulates the 48-bits representing the destination address, namely three 16-bit words, and compares the 48-bit address to an internally stored 48-bit address. When a match occurs, then a match indication signal is provided on line 94. The logic block 84 produces the EAM/R signal based upon the match signal provided by the look-up memory 90. It will be appreciated that, in practice, there may be several memory devices that contribute to producing the EAM/R signal. For example, instead of one CAM that compares 48-bits at once, there may be three circuits each of which separately compares 16-bits of the destination address field to previously stored bits. The input buffers 86 and 88 are used to load digital information into the look-up memory 90. That stored information can be used later, as explained below, to compare against the framed SRD information to determine whether or not there is a match.

The operation of the external circuit 76 is described as follows. The bits in the SRD stream are framed into 16-bit words by the first and second converters 78 and 80. The SRDCLK and the SF/BD signal stream respectively clock individual bits and byte boundaries. The SF signal shown in FIG. 6a delimits the start of SRD information from the destination field of a received packet. The memory 90 loads in the forty-eight bits of the destination address, 16-bits at a time, and then compares the received destination address to addresses already stored in the memory 90. If there is a match, then a match indication signal is provided on line 94.

A large number of destination addresses can be stored in the memory 90. A destination address in a packet can quickly be compared with the stored addresses. Hence, the external circuit 76, in essence, expands the range of physical addresses that can be stored for the MAC 30 and that can be matched without resort to hash techniques. This can speed the packet accept/reject decision and make it more accurate.

As explained below, the provision of a match signal on line 94 can be used as a basis for either accepting or rejecting a packet. Referring to FIG. 5, the match logic 64 receives as in input a match/reject (M/$\overline{\text{R}}$) bit from the RCVFC register 66 and a PROM input from a MAC configuration control register (not shown) of the MAC core 38, as well as the EAM/R signal. The response of the MAC 30 to the EAM/R signal is determined by the match logic which is explained with reference to the following table:

| Prom | M/$\overline{\text{R}}$ | $\overline{\text{EAM/R}}$ | Received Messages |
|---|---|---|---|
| set | x | x | Accept All |
| clear | set(M) | H | Accept-enternal Matches Only |
| clear | set(M) | L | Accept All |
| clear | clear($\overline{\text{R}}$) | H | Accept All |
| clear | clear($\overline{\text{R}}$) | L | Accept-enternal Matches Only |

The MAC 30 can be programmed into a mode in which it captures all packets received by it. This is referred to as promiscuous mode and is invoked when the PROM bit signal is set. When the PROM signal is not set, then the MAC 30 normally captures all packets for which there is an internal physical or logical destination address match as determined by the internal SAD unit 50. The EADI unit 52 enhances this address detection process by providing the ability to interface to an externally stored table of extended physical addresses.

When the M/R̄ bit is set, then the EAM/R̄ input is configures as EAM. When the M/R̄ bit is clear, then the EAM/R̄ input is configured as ĒAR.

In ĒAR mode, upon occurrence of a reject in the external memory 90, the packet will be rejected unless the SAD unit has detected an address match indicating that the packet should be accepted. If the internal SAD unit 50 detects a match, the packet will be accepted regardless of the state of the ĒAR signal.

Referring to FIG. 6b, it will be appreciated that an ĒAR reject should be invoked prior to receipt of packet byte number 65. Otherwise, the MAC 30 will automatically capture the entire packet. In the present embodiment, in the reject mode M/R̄ clear), the ĒAR signal need not be asserted until byte 64. An advantage of this delayed ĒAR assertion option is that slower, less expensive external mechanisms can be used to store and retrieve comparison information. For example, slower hash techniques might be used instead of faster but more expensive CAM circuits.

In contrast, in the present embodiment, in match mode (m/R̄ set), the ĒAM signal must be asserted within 600 ns of the last destination address byte. Otherwise, the packet will be flushed unless an internal address match has been detected Moreover, by inserting a counter delay 96 between the SF/BD generator 62 and the external circuit 76, the field of the packet to be compared can be specified. Specifically, the counter delay 96 can delay the provision of the SF/BD stream until a prescribed number of SBD bytes have passed. In that manner, the 8-bit frames compared in the loop-up memory 90 could be from a different prescribed field such as a protocol field which specifies the data protocol and which typically is located in the data field of the packet.

While a particular embodiment has been illustrated and described, it will be appreciated that the invention is set forth in the appended claims.

What is claimed is:

1. For use with an Ethernet Media Access Controller (MAC) coupled to a system bus and a look-up memory external to the MAC, a method for determining whether to accept or to reject a packet which is decoded by the MAC into a serial data (SRD) signal stream and a serial data clock (SRDCLK) signal and provide accepted packets to said system bus, the method comprising the steps of:
   converting the SRD signal stream into byte frames and loading the frames into a receive FIFO of the MAC;
   while the receive FIFO is being loaded, producing by the MAC a boundary delimiter (BD) signal stream which delimits the boundary of each byte in the frame;
   while the receive FIFO is being loaded, providing the SRD signal stream, the SRDCLK signal and the BD signal stream from the MAC to the look-up memory via a path other than said system bus;
   while the receive FIFO is being loaded, determining whether a selected field in the packet matches information stored in the look-up memory;
   while the receive FIFO is being loaded, informing the MAC by the look-up memory whether a match has been detected; and
   causing said MAC to either accept or reject said packet in response to whether a match has been detected.

2. A method as in claim 1 which further comprises the step of receiving a signal EAM/R̄ defining whether said MAC is to accept or reject a packet in response to a match, wherein said step of causing said MAC to either accept or reject said packet is responsive to whether a match has been detected and said EAM/R̄ signal.

3. A method as in claim 1 wherein said step of causing said MAC to either accept or reject said packet comprises the step of accepting said packet and transferring it to a system memory.

4. A method as in claim 1 wherein said step of causing said MAC to either accept or reject said packet comprises the step of accepting said packet and transferring it to an intermediate memory location or to another MAC for retransmission with said MAC serving as a bridge.

5. A method as in claim 1 which further comprises the step of producing by the MAC a start frame (SF) signal stream which indicates the start of the data portion of the frame.

6. A method as in claim 5 wherein said boundary delimiter (BD) signal stream and said start frame (SF) signal stream are provided on a single line.

7. A method as in claim 1 wherein said step of causing said MAC to either accept or reject said packet comprises a step of rejecting said packet and thereby preserving system memory and system bus bandwidth.

8. A method as in claim 1 wherein said step of causing said MAC to either accept or reject said packet operates in response to a preprogrammed match/reject (M/R̄) bit.

9. A method as in claim 1 wherein said selected field comprises a destination address.

10. A method as in claim 1 wherein said selected field comprises information other than a destination address.

11. For use with a look-up circuit that includes means for receiving serial data and a serial data clock and converting the received serial data into parallel byte frames and a look-up memory that stores digital information and includes means for comparing at least one byte frame with the stored digital information and provide a match indication signal which indicates whether or not there has been a match between the compared byte frame and the stored information, a media access controller (MAC) comprising:
   converter means for converting a packet into a serial data (SRD) signal stream and a serial data clock (SRDCLK) signal;
   a serial-to-parallel decoder for receiving the SRD signal stream and the SRDCLK signal and for converting the SRD signal stream into respective byte frames;
   a receive FIFO for loading the byte frames produced by said decoder;
   means for detecting the start of a packet and for producing a start frame (SF) signal to indicate the start of the packet;
   mean for detecting packet byte frame boundaries and for producing a byte delimiter (BD) signal stream;
   means, other than said system bus, for providing the SRD signal stream, the SRDCLK signal, the SF signal and the BD signal stream to the look-up circuit; and
   means for receiving from the look-up circuit the match indication signal and, responsive to the match indication signal, instructing said receive FIFO whether to flush the loaded byte frames or to provide the loaded byte frames to said system bus.

12. A media access controller as in claim 11 wherein said serial-to-parallel decoder converts the SRD signal stream into respective byte frames independently of the conversion by said look-up circuit of the receive serial data into parallel byte frames.

13. A media access controller as in claim 11 which further comprises means for receiving a signal (EAM/R) defining whether said media access controller is to accept or reject a packet in response to said match indication signal, wherein said means responsive to the match indication signal is also responsive to said EAM/R signal.

14. A media access controller as in claim 11 which further comprises means for transferring an accepted packet to a system memory.

15. A media access controller as in claim 11 which further comprises means for applying an accepted packet to an intermediate memory location or to another MAC for retransmission, with said MAC serving as a bridge.

16. A media access controller as in claim 11 which further comprises a single signal line for carrying both said BD and said SF signals.

17. A media access controller as in claim 11 wherein said means responsive to the match indication signal for instructing said receive FIFO whether to flush the loaded byte frames further comprises a programmable match/reject (M/$\overline{\text{R}}$) bit.

18. A media access controller as in claim 11 wherein said look-up circuit means for comparing operates to compare a destination address.

19. A media access controller as in claim 11 wherein said look-up circuit means for comparing operates to compare information other than a destination address.

* * * * *